(12) United States Patent
Wada et al.

(10) Patent No.: US 7,221,478 B2
(45) Date of Patent: May 22, 2007

(54) DIGITAL IMAGE RECEIVING APPARATUS

(75) Inventors: Tetsuya Wada, Wakayama (JP); Hiroshi Okano, Wakayama (JP)

(73) Assignee: Noritsu Koki Co., Ltd., Wakayama-Ken (JP)

( * ) Notice: Subject to any disclaimer, the term of this patent is extended or adjusted under 35 U.S.C. 154(b) by 798 days.

(21) Appl. No.: 10/230,884

(22) Filed: Aug. 29, 2002

(65) Prior Publication Data

US 2003/0050842 A1 Mar. 13, 2003

(30) Foreign Application Priority Data

Sep. 5, 2001 (JP) .................... P. 2001-268953

(51) Int. Cl.
*G06F 15/82* (2006.01)
*G06F 3/12* (2006.01)
*B41F 33/16* (2006.01)

(52) U.S. Cl. ...................... 358/1.9; 358/1.15
(58) Field of Classification Search ...................... None
See application file for complete search history.

(56) References Cited

U.S. PATENT DOCUMENTS

| | | | |
|---|---|---|---|
| 5,504,506 A | 4/1996 | Noaki | |
| 5,666,215 A | 9/1997 | Fredlund et al. | |
| 5,871,288 A * | 2/1999 | Ryan et al. | 400/103 |
| 6,016,184 A | 1/2000 | Haneda | |
| 6,018,397 A | 1/2000 | Cloutier et al. | |
| 6,198,526 B1 | 3/2001 | Ohtsuka | |
| 6,642,943 B1 * | 11/2003 | Machida | 715/763 |
| 6,670,964 B1 * | 12/2003 | Ward et al. | 345/660 |
| 6,718,353 B2 * | 4/2004 | Hara et al. | 715/502 |
| 6,718,378 B1 * | 4/2004 | Machida | 709/223 |
| 7,159,193 B2 * | 1/2007 | Wada | 715/838 |
| 2001/0019416 A1 * | 9/2001 | Monty et al. | 358/1.9 |
| 2002/0051181 A1 * | 5/2002 | Nishimura | 358/1.15 |
| 2004/0125387 A1 * | 7/2004 | Nagao et al. | 358/1.2 |
| 2005/0141021 A1 * | 6/2005 | Ueda et al. | 358/1.15 |
| 2005/0162670 A1 * | 7/2005 | Shuler | 358/1.2 |

FOREIGN PATENT DOCUMENTS

| | | | |
|---|---|---|---|
| EP | 1 079 593 A2 | | 2/2001 |
| EP | 1291759 A2 * | | 3/2003 |
| EP | 1292096 A2 * | | 3/2003 |
| JP | 09-238211 | | 9/1997 |
| JP | 11-125867 | | 5/1999 |
| JP | 2001-160103 | | 6/2001 |
| JP | 2003076773 A * | | 3/2003 |
| JP | 2003078847 A * | | 3/2003 |
| JP | 2003078869 A * | | 3/2003 |
| WO | WO-00/31966 | | 6/2000 |

* cited by examiner

*Primary Examiner*—Twyler Lamb
*Assistant Examiner*—Myles D. Robinson
(74) *Attorney, Agent, or Firm*—Fulbright & Jaworski L.L.P.

(57) ABSTRACT

A digital image receiving apparatus includes a media drive (11) for reading image information from a storage medium (M1), an image information processing unit (22) for processing the image information to display a plurality of images in the image information read by the media drive, in thumbnail image form on a display (12), and an order information processing unit (24) for creating order information including which images to be printed from a printing order given by a customer for each image displayed on the display (12). The image information processing unit (22) includes an image data size acquisition unit (22a) for acquiring image data sizes of image data included in the image information and serving as printing sources. Information on the image data sizes acquired is displayed on the display (12) as associated with thumbnail images of corresponding image information.

10 Claims, 11 Drawing Sheets

FIG.5

```
RECEIPT
Customer Name
       ○○○○
Telephone No.
       012-345-6789
Reception No.:R0000029
Terminal ID   :CT01
Date of Reception :2001.08.02
Order No.          Size: L
  ord0001
30 yen X 40 prints
                        ¥1200
Basic fee               ¥300
Consumption Tax 5.000%  ¥75
Total                   ¥1575
    Please take this receipt
    to our service counter.

ABC Cameras
     Umehara, Wakayama
            TEL012-987-6543

COPY FOR CUSTOMER
Customer Name
       ○○○○
Telephone No.
       012-345-6789
Reception No.:R0000029
Terminal ID   :CT01
Date of Reception :2001.08.02
Order No.          Size: L
  ord0001
30 yen X 40 prints
                        ¥1200
Basic fee               ¥300
Consumption Tax 5.000%  ¥75
Total                   ¥1575
        ABC Cameras
     Umehara, Wakayama
            TEL012-987-6543
```

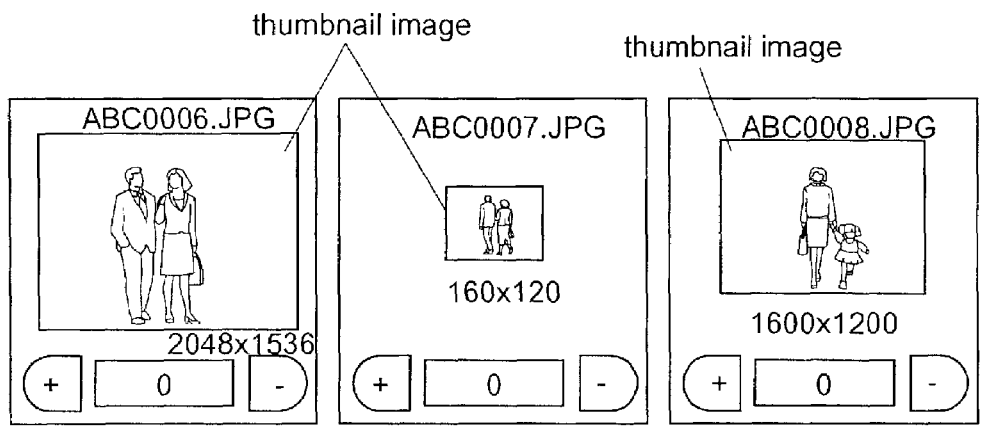

DIGITAL IMAGE RECEIVING APPARATUS

BACKGROUND OF THE INVENTION

1. Field of the Invention

This invention relates to a digital image receiving apparatus having media drives for reading image information from storage media, an image information processor for processing the image information to display a plurality of images of the image information read by the media drives in thumbnail image form on a display, and an order information processor for creating order information including particulars of prints from an order given by a customer for prints of the respective images displayed on this display.

2. Description of the Related Art

A digital image receiving apparatus constructed as described above is disclosed in Japanese Patent Publication (Unexamined) 2001-160103, for example. When a medium storing image information acquired with a digital camera is set to this receiving apparatus, a liquid crystal screen forming part of the receiving apparatus displays, in thumbnail images, the image information stored in the medium. The liquid crystal screen includes a touch panel by means of which the operator can input order information relating to a printing order i.e. which images should be printed. After printing information including the image information and order information is inputted, the apparatus prints a copy of the order to be given to the customer. A photo processing shop receives the copy of the order from the customer, and transmits the printing information from the receiving apparatus to a printing apparatus through a data transmission network. The printing apparatus uses the image information included in the printing information successively transmitted from the receiving apparatus, to form its copy images on silver bromide printing paper. As a rule, such receiving apparatus is operated by the customer, to contribute to labor saving at the photo processing shop.

The customer who orders print outputs through a printing system combining such digital image receiving apparatus and printing apparatus expects prints of high image quality from image information acquired from digital cameras or CG production, as in the form of conventional silver bromide photos, by using the services of a photo processing shop. However, when outputting prints from image information acquired with a digital camera or the like by using a high-performance digital printing apparatus, an image data size of original images and a print size must match the printing resolution of the digital printing apparatus in order to output prints of high image quality, That is, when print outputs in a small print size are desired, the image data size of original images may also be small. However, when print outputs in a large print size are desired, an image data size must be large enough for the printing apparatus to produce the print size in a required resolution. When the image data size is too large, printing image quality is not seriously affected since data may only be thinned out. When the image data size of the original images is too small, lacking image data must be created artificially by interpolation, which lowers the image quality of print output.

The conventional digital image receiving apparatus produces thumbnail images from image information inputted by the customer, who places a print order only while looking at the small thumbnail images appearing on the display. Even when image information of image data size not suitable for print output is included image information of a plurality of images inputted, the customer could inadvertently place a printing order without noticing it.

SUMMARY OF THE INVENTION

This invention is made having regard to the state of the art noted above, and its object is to provide a digital image receiving apparatus capable of taking into account a size of image data serving as a printing source when the customer makes a printing order.

The above object is fulfilled, according to this invention, by a digital image receiving apparatus comprising a media drive for reading image information from a storage medium, an image information processing unit for processing the image information to display a plurality of images in the image information read by the media drive, in thumbnail image form on a display, and an order information processing unit for creating order information including which images to be printed from a printing order given by a customer for each image displayed on the display, characterized in that the image information processing unit includes an image data size acquisition unit for acquiring image data sizes of image data included in the image information and serving as printing sources, information on the image data sizes acquired being displayed on the display as associated with thumbnail images of corresponding image information.

In this construction, the image data size acquisition unit derives the sizes of image data included in the image information provided by a customer and serving as printing sources. Information on the image data sizes acquired are displayed on the display as associated with thumbnail images obtained from the image information. The customer, when making an order for print output while looking at the display, can obtain information on the image data sizes of the image information, and take the image data sizes into account in making the order.

As one specific example of information on the image data sizes displayed on the display as associated with the thumbnails of the image information, this invention proposes to express the information in sizes of display areas of the thumbnail images. That is, image information having a larger size than a predetermined image data size is displayed in a larger thumbnail image. Image information having a smaller size than the predetermined image data size is displayed in a smaller thumbnail image. Thus, the customer may visually confirm image data sizes of the image information for which an order is to be made for print output. A diminutive thumbnail image may be displayed particularly where image data requires interpolation and reduced image quality is expected if outputted in a desired print size. Then, a customer having no knowledge of digital printing may readily understand suitability of image data sizes.

As one simple example of information on the image data sizes displayed on the display as associated with the thumbnails of the image information, this invention proposes to express the information in numerical values. Generally, in the field of digital image processing, an image data size is expressed in the number of horizontal pixels by the number of vertical pixels. By displaying image data sizes in such numerical values and as associated with the thumbnail images of the image information, the customer may make an order for print output through this digital image receiving apparatus by taking the image data sizes into account.

To determine whether image size data of the image information given by the customer is suitable for printing in a desired print size, one must know an optimal resolution of a printing apparatus. It is difficult for an ordinary customer to make the judgment. To solve this problem, in one preferred embodiment of this invention, a print quality information determining unit is provided for deriving information on print quality for ordered print sizes from a resolution of a printing apparatus that forms images on recording sheet by using the image data, and the image data sizes, and the information on print quality is displayed on the display as associated with the respective thumbnail images. As a result, the customer may easily confirm suitability of the image information provided by the customer himself or herself for output in a desired print size.

As a simple specific example, the information on print quality may show differences between optimal print sizes derived from the resolution of the printing apparatus and the image data sizes, and the ordered print sizes. When an ordered print size is larger than the optimal print size, a reduction in image quality is expected since the image data is interpolated.

As a preferred embodiment for enabling the customer to understand easily whether the image data sizes are suitable or not for ordered print sizes, it is proposed that, when the image data sizes are not suitable for the order print sizes, the display areas of the corresponding thumbnail images are made smaller than when the image data sizes are suitable. This enables the customer to determine visually that the image information given to this receiving apparatus is insufficient for print output in the desired print size.

To indicate in a readily understandable form regarding print image quality to what extent an ordered print size deviates from the optimal print size, the information on print quality may advantageously be a rate of thinning-out or interpolation applied to the image data in time of printing.

The most significant reason for taking into account the sizes of image data serving as printing sources when making an order for prints is that the image data sizes are a factor determining the image quality of print output. It is therefore in accordance with the object of this invention to omit the display of image data sizes and display only print quality information. Such a digital image receiving apparatus comprises a media drive for reading image information from a storage medium, an image information processing unit for processing the image information to display a plurality of images in the image information read by the media drive, in thumbnail image form on a display, and an order information processing unit for creating order information including which images to be printed from a printing order given by a customer for each image displayed on the display, the digital image receiving apparatus being characterized in that a print quality information determining unit is provided for deriving information on print quality for ordered print sizes from a resolution of a printing apparatus that forms images on recording sheet by using image data included in the image information and serving as printing sources, and the image data sizes, the information on print quality being displayed on the display as associated with the respective thumbnail images.

Other features and advantages of this invention will be apparent from the following description of the embodiment to be taken with reference to the drawings.

BRIEF DESCRIPTION OF THE DRAWINGS

FIG. 5 is an explanatory view of a receipt issued by the receiving apparatus;

FIG. 11 is a view of a display screen showing a further modified form of number of prints setting screen;

FIG. 12 is a view of a display screen showing one example of operating screen in time of receiving an order.

DESCRIPTION OF THE PREFERRED EMBODIMENT

An embodiment of this invention will be described hereinafter with reference to the drawings.

Figure 1:
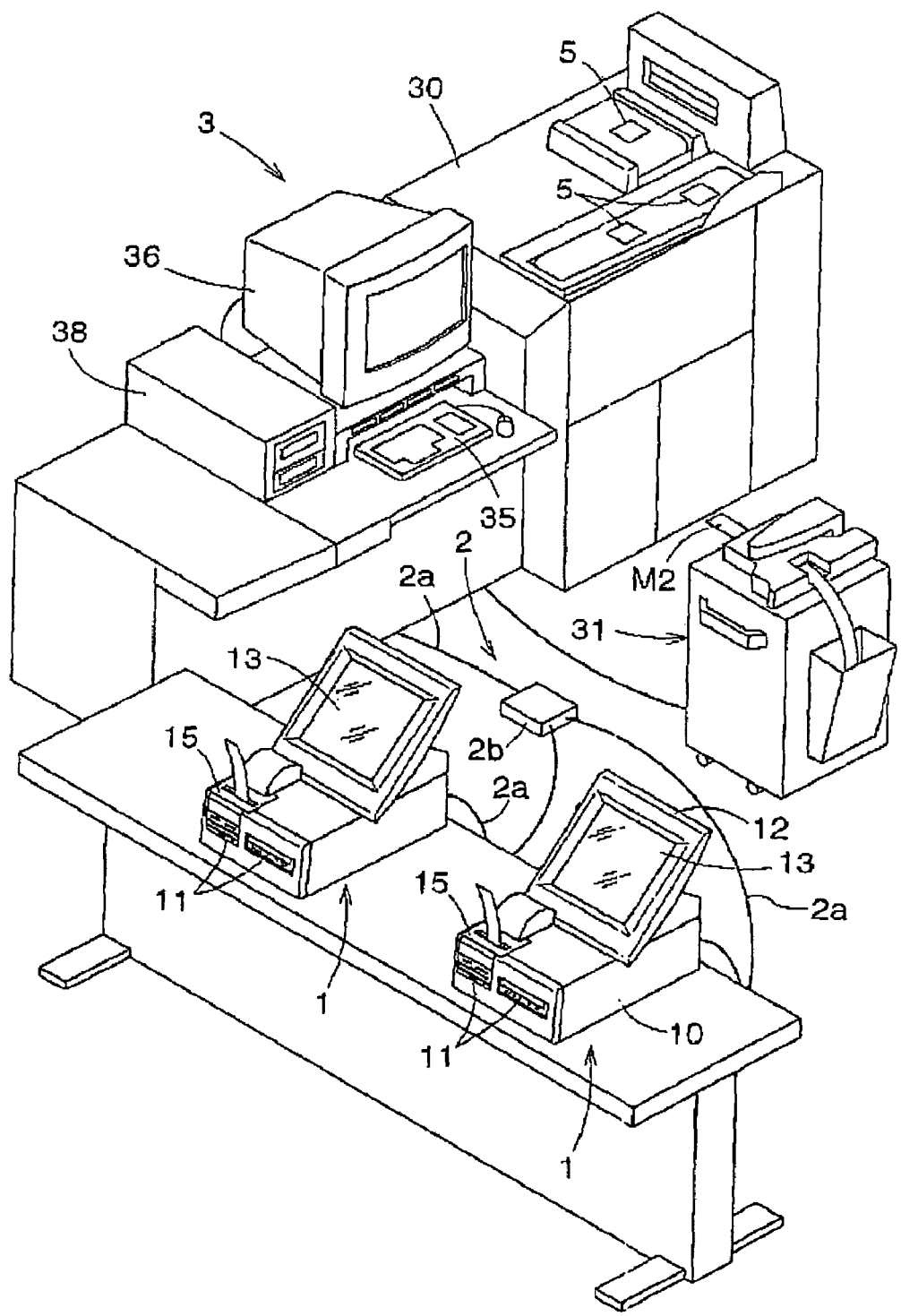
FIG. 1 is a perspective view showing an outward appearance of a printing system employing digital image receiving apparatus according to this invention.

As shown in FIG. 1, a printing system includes a plurality of digital image receiving apparatus hereinafter simply called receiving apparatus) 1 connected through a data transmission network 2 to a digital type photo printing apparatus 3 for printing image information on silver bromide printing paper 5 serving as recording sheets. This printing system is constructed by adding, to the existing photo printing apparatus 3 of a photo processing shop, a network 2 including Ethernet cables 2a and a hub 2b and two receiving apparatus 1. The receiving apparatus 1 receive image information to be outputted as prints from storage media M1 such as Smart Media and CompactFlash storing image information acquired with digital cameras, and CD-ROMs and MOs storing image information made by individuals, and order information including the numbers of prints to be outputted. A customer shows a receipt issued when an order is received, to a shop assistant at the counter of the photo processing shop. Based on order information recorded on the receipt, the shop assistant operates the photo printing apparatus 3 to fetch, through the network 2, relevant printing information including image information and order information temporarily stored in one of the receiving apparatus 1. Based on this printing information, the photo printing apparatus 3 outputs prints 5 to be handed to the customer.

[Receiving Apparatus]

Figure 2:
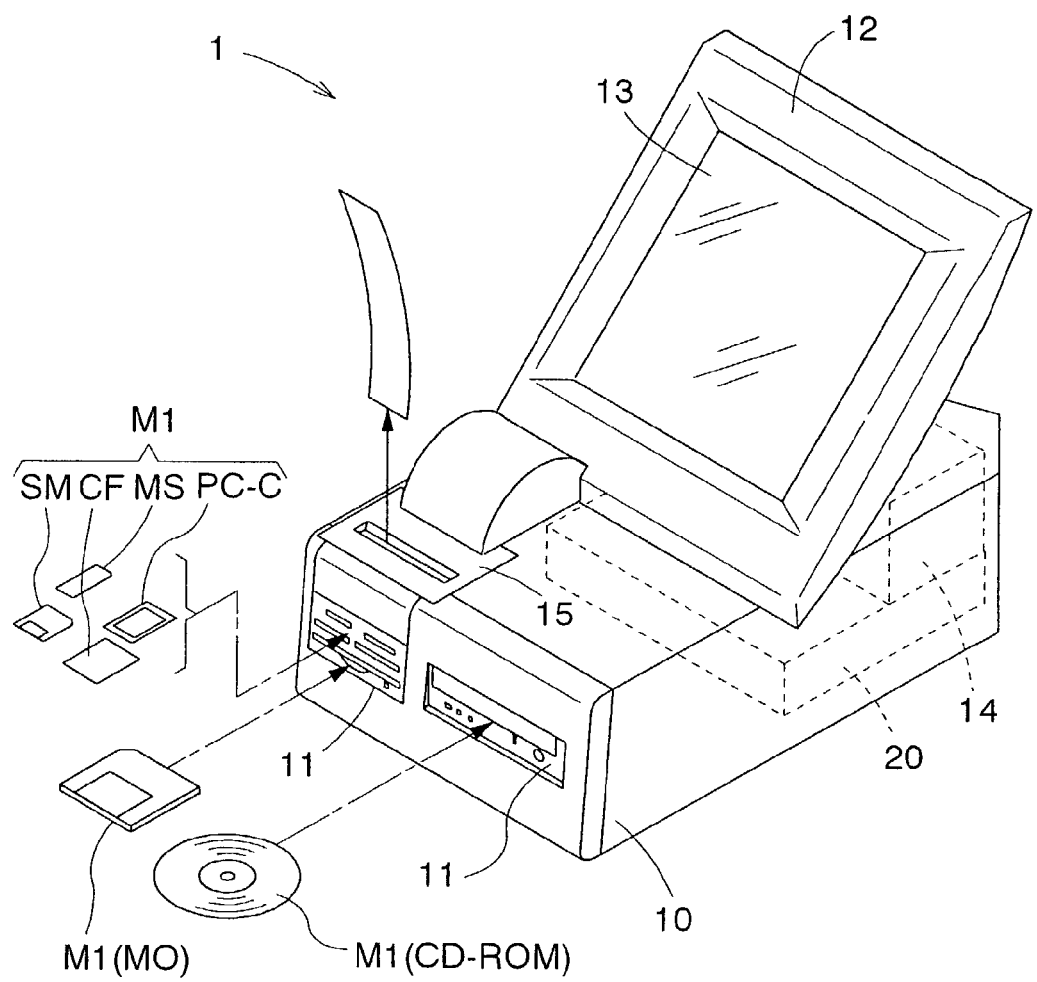
FIG. 2 is a perspective view of a digital image receiving apparatus.

The receiving apparatus 1 will be described hereinafter. As shown in FIG. 2, each receiving apparatus 1 includes a case 10, and a liquid crystal display 12 mounted on an upper surface of the case 10 and defining a touch panel 13 on a display surface thereof. The case 10 has, arranged in a front surface thereof, a plurality of media drives 11 for receiving varied media M1 such as Smart Media SM, CompactFlash CF, memory sticks MS, PC cards PC-C acting as attachment to the media, CD-ROMs and MOs. A receipt printer 15 of the thermal transfer type is disposed on the upper surface of the case 10 forwardly of the display 12 for issuing order receipts. Further, the case 10 contains a controller 20 in the form of a general purpose computer acting as a data processing device of this receiving apparatus.

The functions of controller 20 are substantially the same as those of a general purpose computer having network functions. The controller 20 communicates information with the plurality of media drives 11 and touch panel 13, creates printing information from acquired image information and order information for use by the printing apparatus 3 to output prints, controls storage on a hard disk 14 acting as data storage unit, and controls the receipt printer 15. This controller 20 employs Windows 2000 of Microsoft Corporation as operating system (OS), and produces various functions needed by the receiving apparatus 1, by means of various programs provided by this operating system, and various programs created for operation on the operating system, and in cooperation attached hardware.

In this embodiment, the network 2 between the receiving apparatus 1 and between the receiving apparatus 1 and printing apparatus 3 is built by using a TCP/IP communication protocol included in this operating system. However, a different network protocol may be used. What is important here is that the hard disk 14 opened to the network 2 as a network drive, that is printing information is stored in a common folder and made accessible to the printing apparatus 3 and, according to circumstances, to the other receiving apparatus 1.

Figure 3:
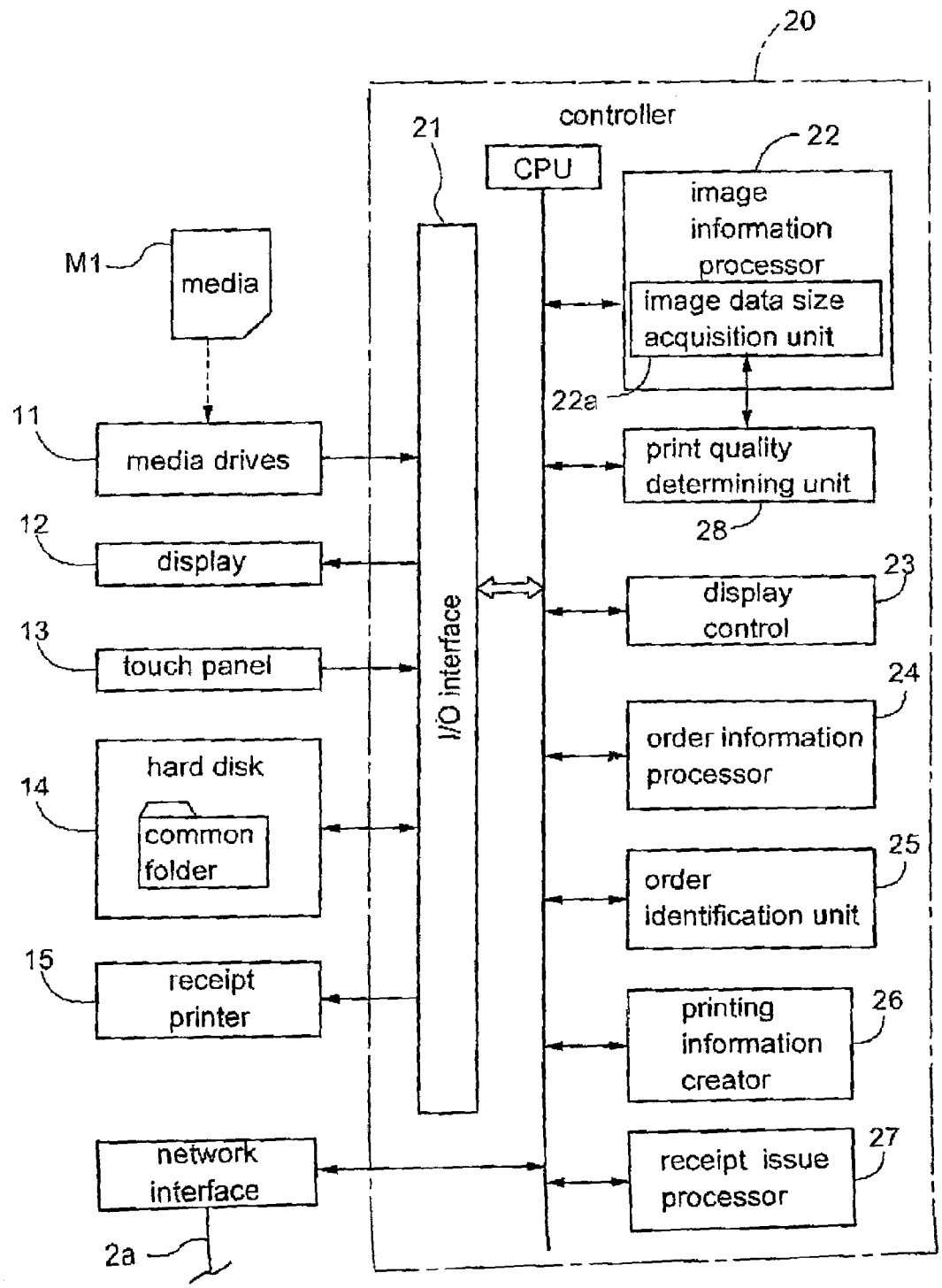
FIG. 3 is a functional block diagram illustrating functions of a controller of the receiving apparatus.

The controller 20 is connected through an I/O interface 21 with external devices such as media drives 11 and hard disk 14 provided for the receiving apparatus 1, and has various functions produced by hardware and software (programs). Those of the functions that concern this invention include, as shown in the functional block diagram of FIG. 3, an image information processing unit 22 for processing image information (photo image data and the like) taken from media M1 provided by customers through the media drives 11, an image data size acquisition unit 22a for acquiring sizes of image data, serving as printing sources, in the image information taken in, a display control unit 23 for displaying a variety of information on the display 12, an order information processing unit 24 for producing order information from print sizes and numbers of prints inputted by the customers which will be described in detail later, an order identification information applying unit 25 for creating a unique order number and a terminal ID specifying the receiving apparatus 1 as one example of order identification information each time a customer gives an order for prints, a printing information creating unit 26 for creating printing information including the above image information and order information, and hierarchically storing the printing information in the common folder on the hard disk 14, a receipt issue processing unit 27 for issuing through the receipt printer 15 receipts recording data such as customer names and printing charges besides the above terminal ID and order numbers, and a print quality information determining unit 28 for deriving print quality information whether appropriate quality is obtained for print output in ordered print sizes from the printing resolution of the printing apparatus 3 and the image data sizes acquired by the image data size acquisition unit 22a.

When an order is processed in this receiving apparatus 1, the image information processing unit 22 acquires or creates thumbnail images (usually small images of about 160 by 120 pixels) from image information taken in through a media drive 11. When the customer gives a an order for prints while looking at the thumbnail images displayed on the display 12, the order information processing unit 24 creates order information.

Along with the display of the thumbnail images on the display 12, the image data sizes acquired by the image data size acquisition unit 22a also are displayed, in numerical values in this embodiment. That is, a data size in the form of the number of horizontal pixels by the number of vertical pixels is displayed as associated with a corresponding thumbnail image, e.g. to the lower right of the thumbnail image.

A process of acquiring image sizes of image data from an image file serving as image information is well known. Where the file format is Exif-JPEG, the file may be opened and ImageWidth (width of an image) and ImageLength (height of the image) may be acquired from TIFF header data read. Where the file format is 24 bits Bitmap, the file may be opened and biWidth (width of an image) and biHeight (height of the image) may be acquired from bit map header data read. In the case of a format with a header not providing such data concerning an image data size, the image data size may be determined after expanding the image data in memory.

As a further preferred embodiment, the print quality information determined by the print quality information determining unit 28 also is displayed as associated with a corresponding thumbnail image. Such print quality is known in the field of digital printing, and may be determined from the size of image data serving as printing source, a print size and the printing resolution of the printing apparatus 3.

Where the printing resolution is about 300 dpi (dots/inch), an image data size of 2400 by 1600, for example, is outputted as a print sized about 20 by 13 cm (approximately corresponding to 2L size) or smaller, to have image quality that makes full use of the resolution of the printing apparatus 3. Assuming that the same printing apparatus 3 (i.e. the resolution of 300 dpi), an image data size of 1600 by 1200 is outputted as a print sized about 13 by 10 cm (approximately corresponding to L size) or smaller. Where a medium M1 loaded to the receiving apparatus 1 has image information of an extremely small image data size like a thumbnail image (e.g. image data size of about 200 by 100 pixels), the size of prints outputted as it is will be about 1 cm. Even if an interpolation process is ventured to obtain prints in 1L size, resulting image quality will be too coarse for appreciation. Thus, it is also important to inform the customer that proper prints cannot be obtained from image information requiring an interpolation of two-fold or more, for example, when printed in an ordered print size. In such a case, a warning "unsuitable for printing" may simply be given. Various expressions of such print quality information will be described hereinafter.

Figure 4:
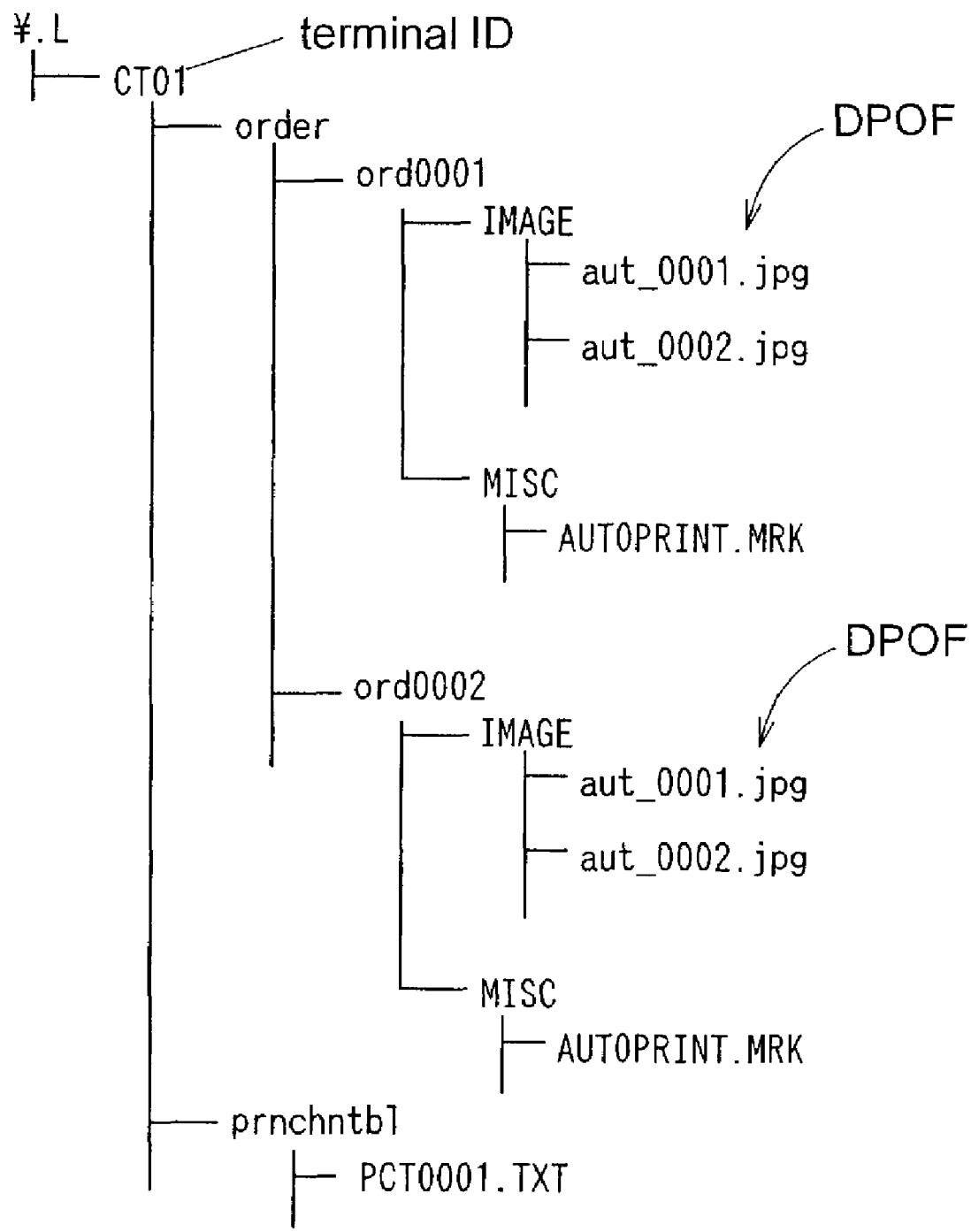
FIG. 4 is an explanatory view illustrating a directory structure for printing information storage on a hard disk of the receiving apparatus

FIG. 4 shows a typical example of printing information hierarchically stored in the common folder of hard disk 14 by the function of the printing information creating unit 26. In this example, as seen from FIG. 4, the hard disk 14 acting as network drive has a drive name "L" is allocated thereto, and has a common folder created and given the terminal name of this receiving apparatus 1 (terminal ID), i.e.

"CT01". Below this, a directory "order" is provided. Below this, folders (=directories) under the name of unique order numbers created by the identification information applying unit 25 are provided, each folder storing image information and order information concerning printing output, basically in the file format of DPOF (Digital Print Order Format), in separate IMAGE directory and MISC directory. By such a directory management, the operator of the printing apparatus 3 having received a receipt determines, from the terminal ID and order number, a directory to be accessed for a printing operation. The image information serving as printing source may readily be retrieved from the IMAGE directory, and the order information such as a print size and the number prints from the MISC directory. It is of course possible to perform this information retrieving operation automatically.

FIG. 5 shows one example of receipts issued to the customers based on the data created by the receipt issue processing unit 27 and through the receipt printer 15. In this example, the receipt is continuous with a copy for customer's keeping that records substantially the same contents. The customer may split the slip in the middle and had the receipt to the operator of the printing apparatus 3, and keeps the other half, i.e. the copy. Recorded on the receipt are the customer's name and address (or telephone number), the terminal ID that specifies the receiving apparatus 1 having received this printing order, an order number, a print size such as L or 2L, the number of prints to be made, a charge for this printing order, and so on.

[Printing Apparatus]

Figure 6:
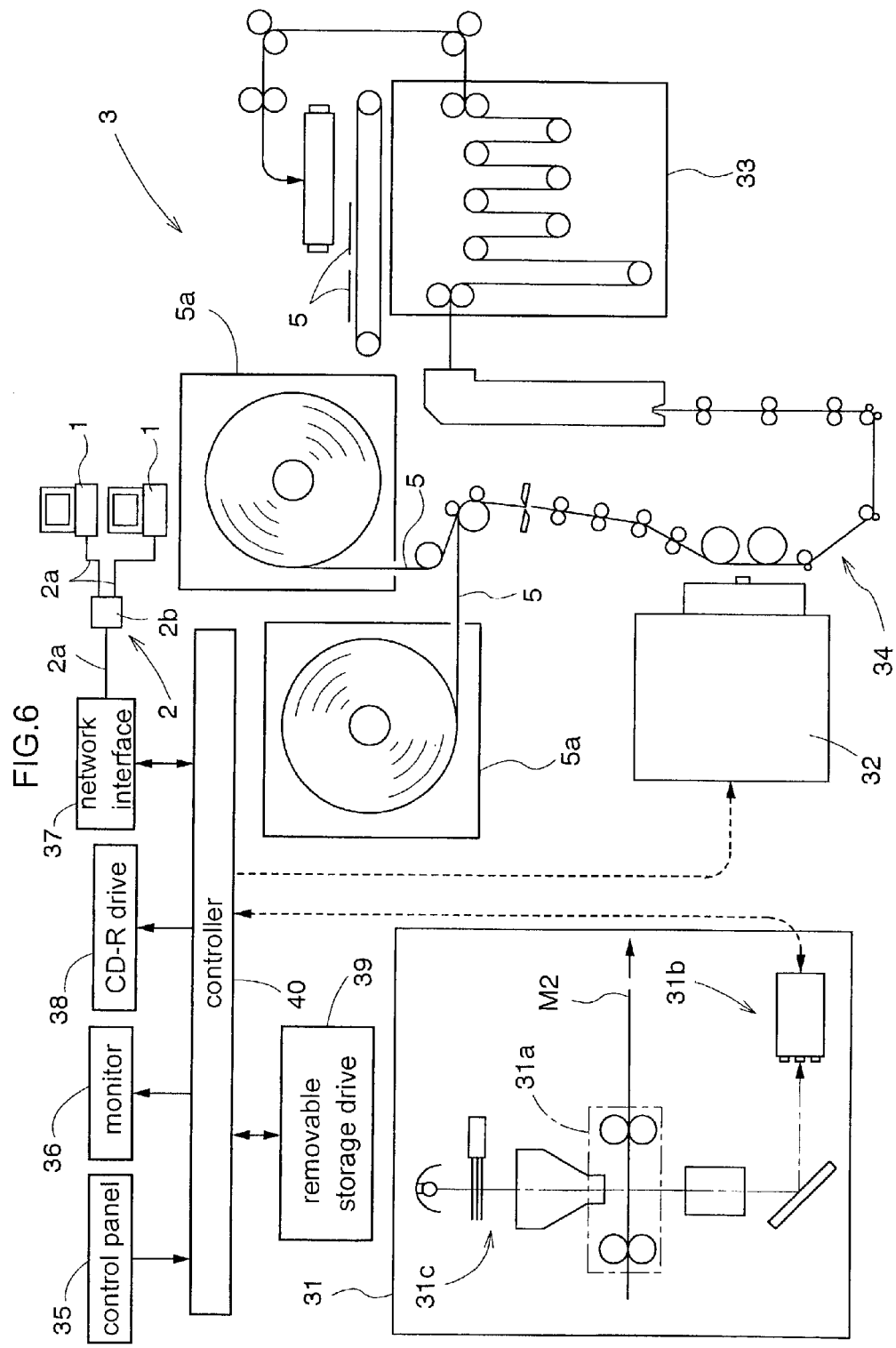
FIG. 6 is a block diagram schematically showing a printing apparatus forming part of the printing system.

The photo printing apparatus 3 will be described hereinafter. As seen from FIG. 1, This photo printing apparatus 3 includes a main apparatus body having a case 30 integrating an operation unit formed on a table and a developing section, and a scanner unit 31 disposed in a position separated from the main apparatus body. As will be understood from FIGS. 1 and 6, the main apparatus body houses an exposing unit having a digital type print head 32 for printing images on printing paper 5 transported by a paper transport mechanism 34 from a paper magazine 5a and cut to a print size. The developing section includes a developing tank 33 for developing the printing paper exposed by the print head 32. The printing paper 5 developed in the developing tank 33, dried, and placed on a transverse feed conveyer. The printing paper 5 is transported from the transverse feed conveyer to a sorting conveyer. The print head used herein in the type that emits a scanning laser beam in a direction perpendicular to a direction of transport of printing paper 5. Other types of print head may be used, such as the fluorescent beam type, liquid crystal shutter type, DMD type and FOCRT. In any case, the printing resolution is about 300 dpi.

The operation unit includes a control panel 35 having a keyboard and a mouse, and a monitor 36 for displaying various control information and simulation image for pre-judgment. Further, a CD-R drive 38 is provided for printing image information acquired by the receiving apparatus 1 on recording media such as CD-Rs.

As described in detail later, to cope with a case of transferring printing information from the receiving apparatus 1 to the printing apparatus 3 off-line by means of removable storage media, a removable storage drive 39 is provided for reading from removable storage media the printing information collected from the receiving apparatus 1.

The scanner unit 31 includes a film carrier 31a changeably mounted on an upper surface of a case with casters attached to the bottom thereof, and a photoelectric converter 31b mounted in the case and having photoelectric conversion elements such optical lenses and CCDs. An arm is provided for leading a light beam from a light source 31c mounted in the case through an optical fiber to an upper surface of the film carrier 31a. For scanning a photo film M2, may it be a negative film or positive film, the film M2 is set to the film carrier 31a which is moved at a predetermined speed, and a light beam is emitted from the forward end of the arm. The photoelectric converter 31b converts image information in each frame of photo film M2 into digital signals which are forwarded to the main apparatus body.

Further, the printing apparatus 3 has a controller 40 in the form of a general purpose computer mounted in the case 30 to act as a data processing device of this printing apparatus 3. This controller 40 also employs Windows 2000 of Microsoft Corporation as operating system (OS), and produces various functions needed by the printing apparatus 3, by means of various programs provided by this operating system, and various programs created for operation on the operating system, and in cooperation attached hardware. The controller 40 is in network connection to the two receiving apparatus 1 through a network interface 37.

Figure 7:
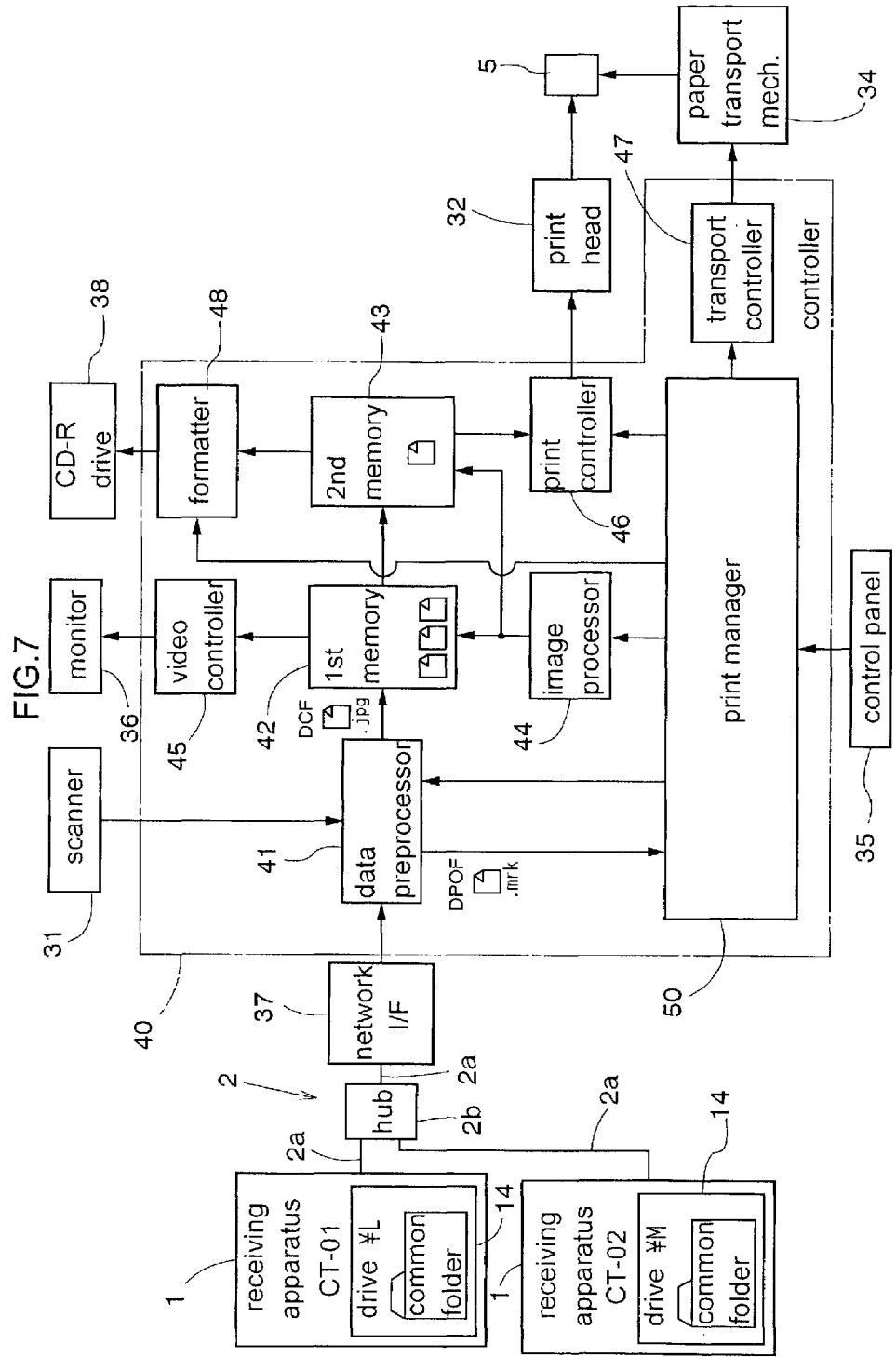
FIG. 7 is a functional block diagram illustrating functions of the controller of the receiving apparatus.

The controller 40 has functions produced by hardware and software (programs). Those of the functions that concern this invention include, as shown in the functional block diagram of FIG. 7, a data preprocessing unit 41 for acquiring, through the network 2, printing information stored on the hard disk of receiving apparatus 1 from a folder (directory) identified by a predetermined order number, dividing the printing information into image information and order information, and sending the image information to a first memory 42 and order information to a print manager 50, an image processing unit 44 for successively transferring image data to a second memory 43 frame alter frame from the image information sent to the first memory 42 and performing an image processing such as color correction, a video controller 45 for generating video signals of simulation images serving as expected print images and other correction information in time of a pre-judge operation such as color correction and sending the video signals to the monitor 36, a print controller 45 for controlling the print head 32 based on image data resulting from the image processing, a transport controller 47 for controlling the paper transport mechanism 34 for transporting the printing paper 5 exposed by the print head 32 and developed in the developing tank 33, and a formatter 48 formatting the image data resulting from the image processing to write the data on a CD-R again according to the order number as requested by the customer. Image information acquired by the scanner 31 also is sent to the data preprocessing unit 41. After receiving a suitable scan data preprocessing, the information is sent to the second memory 43 through the first memory 42, and ultimately used in making prints 5.

The print manager 50 has a core function for controlling the printing apparatus 3 to make the number of photo prints in the print size ordered by the customer from the image information sent to the data preprocessing unit 41, based on the order information from the receiving apparatus 1 or order information inputted through the control panel 35.

[Reception Processing at Receiving Apparatus]

Figure 8:
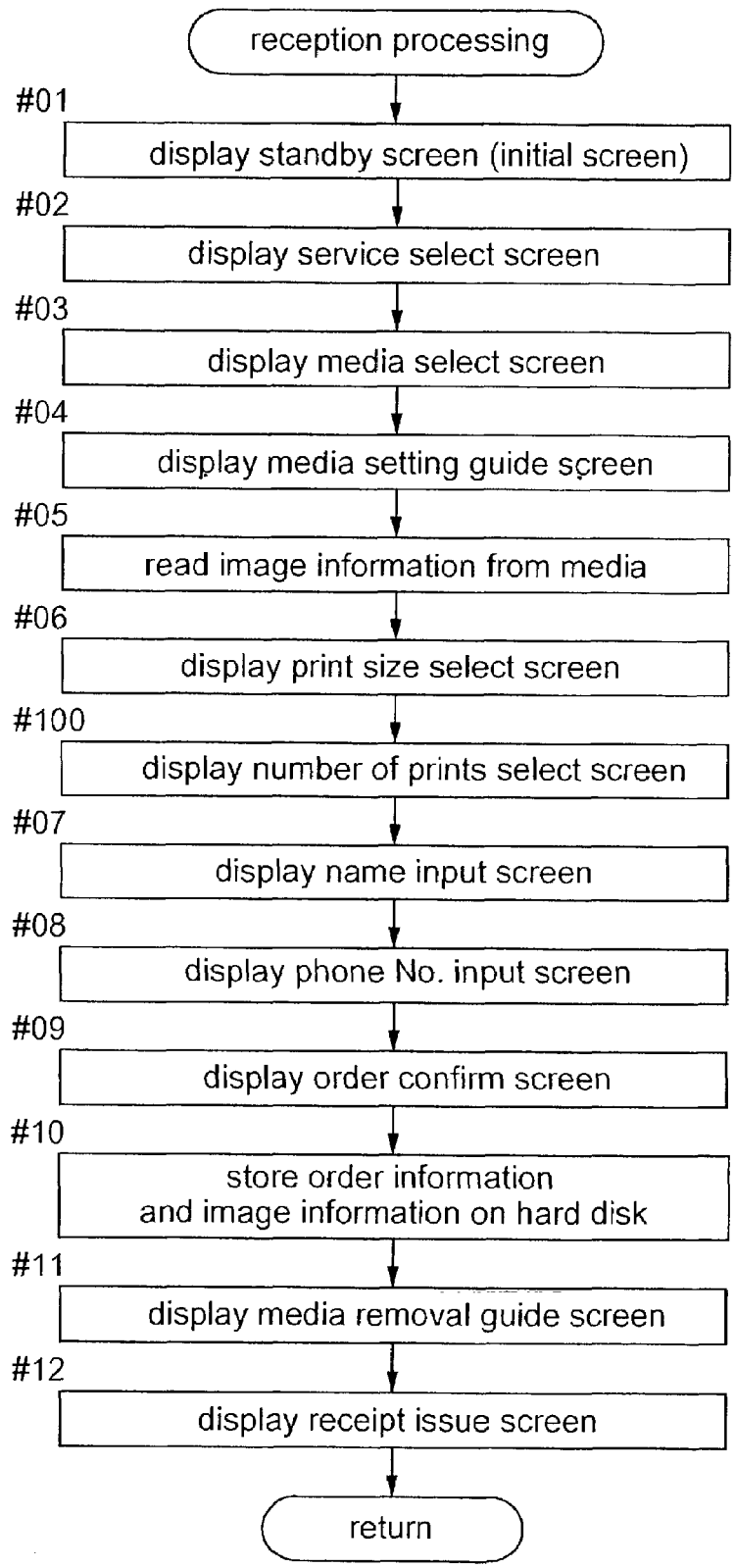
FIG. 8 is a flow chart of an operating sequence in time of receiving an order.

Reception processing at the receiving apparatus 1 is performed in interaction with the customer through the display 12. FIG. 8 shows a flow chart illustrating changes of screens successively displayed on the display 12. The reception processing will be described next with reference to this flow chart.

First, in the state of standby, the display 12 shows a standby screen including the functions of the receiving apparatus 1, a logo mark of the photo processing shop and the like (#01). When ordering photo prints, the customer places a finger on the touch panel 13 on the display 12, which causes a "service select screen" to be displayed (#02). This screen shows a message "Please select services.", a print order reception switch, and a media save reception switch (the service of writing data to a CD-R or the like), and prompts the customer to make selections.

When the print order reception switch is operated on the "service select screen", a "media select screen" is displayed next (#03). The "media select screen" shows a message "Please select medium." and a plurality of switches for selecting media M1, and prompts the customer to make a selection. When the customer touches a switch corresponding to a medium M1 used, a next process is executed. The "service select screen" includes, shown in lower positions thereof, a stop button for discontinuing the processing, and a return button for returning to the previous stage of processing. These stop button and return button are shown in the same positions in the subsequent processing described hereinafter, and perform the same functions.

Next, a "media setting guide screen" is displayed (#04). This screen shows a message "Please set medium and press OK button." and specific images for setting a corresponding medium M1. When the customer sets the medium M1 to a media drive and operates the OK button, image information is read from the medium M1 (#05), and then a next processing is executed.

After the medium M1 is set following the "media setting guide screen", a "print size select screen" is displayed (#06). This screen shows a message "Please select print size." and size specifying switches corresponding to a plurality of print sizes. Each size specifying switch includes characters "L size", "2L size" or the like indicating a print size, numerical values indicating the print size, a unit price of prints and a basic charge for printing. When one of the size specifying switches is operated, a next processing is executed.

Subsequently, a "number of prints select screen" is displayed (#100). This screen shows a message "Please select the number of prints." and a plurality of thumbnail images created from image information read from the medium M1. The screen further includes besides the stop button and return button shown in lower positions thereof, a "next" button acting as a display button. The screen includes also an information area shown in a lower middle position thereof. Where there is a further number of prints select screen with thumbnail images, a shift is made to the next screen by pressing the "next" button. If what is displayed is the final screen, a shift is made to the next step by pressing the OK button shown on the screen.

Figure 9:
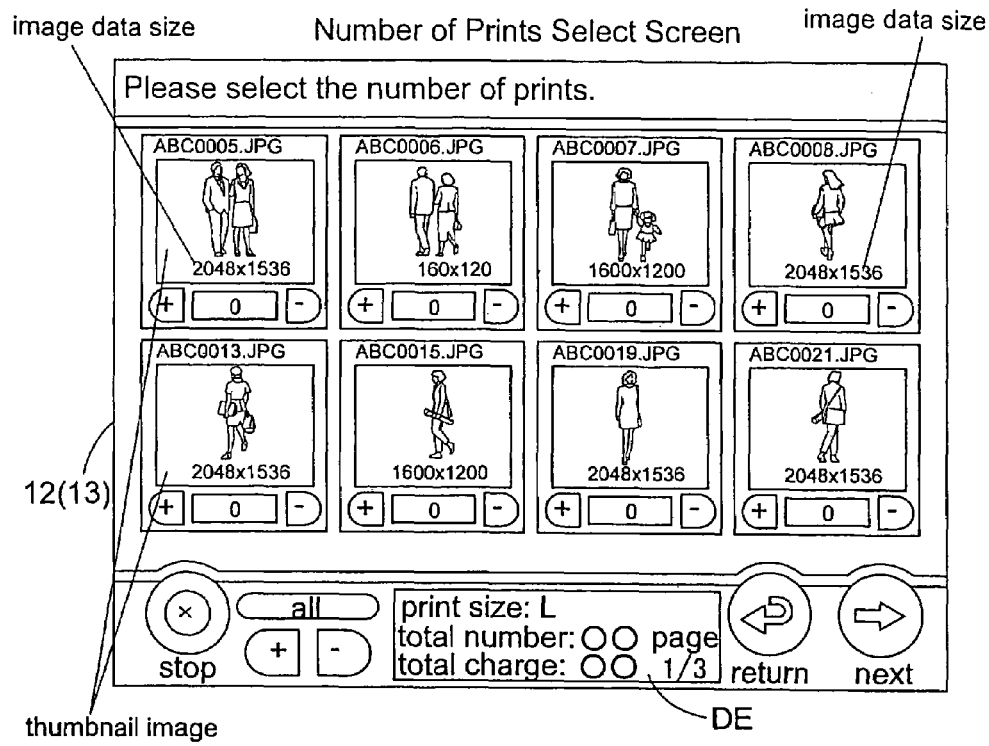
FIG. 9 is a view of a display screen showing one form of number of prints setting screen.

FIG. 9 shows one example of number of prints select screen with thumbnail images. Each thumbnail image includes, in a lower right position thereof, an image data size acquired by the image data size acquisition unit 22a and shown in the form of the number of horizontal pixels by the number of vertical pixels.

Figure 10:
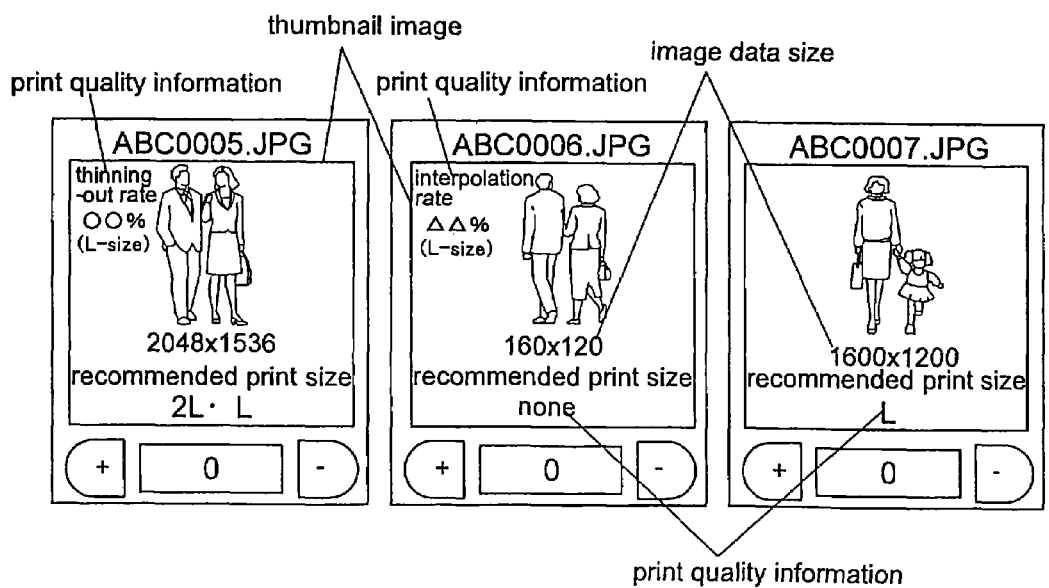
FIG. 10 is a view of a display screen showing a modified form of number of prints setting screen.

Further, print quality information determined by the print quality information determining unit 28 may be displayed along with or in place of the image data size. FIG. 10 shows one example of a portion of such number of prints select screen. Each thumbnail image includes a print size, i.e. a recommended print size, that makes full use of the performance of the printing apparatus 3 in view of the image data size and the resolution of the printing apparatus 3 as noted hereinbefore. For example, the thumbnail image with an image data size 2048 by 1536 shows "recommended print size: 2L & L". The thumbnail image with an image data size 160 by 120 shows "recommended print size: none". The thumbnail image with an image data size 1600 by 1200 shows "recommended print size: L". When the print size selected at step #6 is included in the recommended print size, a print output may be obtained in expected image quality. When the print size selected is not included in the recommended print size, or no recommended print size is given, it is desirable, except under special circumstances, to reconsider the print size or select different image information as printing source As a user friendly visual presentation of print quality information and image data size, display areas of the thumbnail images may be utilized as shown in FIG. 11. This is an important feature of this invention.

Regarding the visual presentation of image data size, the thumbnail image may be displayed in an area varied according to an image data size, thereby allowing the customer to perceive the image data size by intuition. The thumbnail image at the left in FIG. 11, for example, is displayed in a display area corresponding to the image data size 2048 by 1536. The thumbnail image at the right is displayed in a display area corresponding to the image data size 1600 by 1200. That is, a visual comparison may be made of relative sizes of image data in image information.

Regarding the visual presentation of print quality information, the thumbnail image is displayed in a normal display area for image information of image data size determined by the print quality information determining unit 28 to be appropriate in view of the print size selected. When the image data size is insufficient, the thumbnail image is displayed in a distinctly diminished area, e.g. ¼ of the normal area. This allows the customer to know by intuition that prints may be outputted in low image quality.

In the example shown in FIG. 11, compared with the right and left thumbnail images, the middle thumbnail image is displayed in an area diminished to the extent of indicating that its image information is inappropriate for printing. That is, a visual representation is given to indicate that the image information corresponding to the right and left thumbnail images may be printed in proper image quality, but the image information corresponding to the middle thumbnail image cannot be printed in proper image quality, Further, though not shown in the drawings, as a representation of print quality information, each thumbnail image may have, shown adjacent thereto, a rate of thinning- out or interpolation applied to the image data printed. A high thinning- out rate means that the image data size is more than enough for the print size, and a still larger print size is possible. Conversely, a high interpolation rate means that the image data size is insufficient for the print size, and suggests that a smaller print size should be selected or print output must be given up.

These various image data sizes and forms of print quality information on the number of prints select screen may be used alone or in a suitable combination, or may be selected. In the above example, numerical values indicating image data sizes and print quality information are both displayed. However, it is sufficient to display only print quality information from the viewpoint of displaying sizes of image data serving as printing source for the purpose of checking the image quality of print output.

On the number of prints select screen, the numerical value in a number of prints display area in the frames of all thumbnail images is initially set to "0". The number of prints is incremented by one by operating a plus button, and decremented by one by operating a minus button. The number of prints selected in this way is displayed in the number of prints display area.

After selecting the numbers of prints for all image information, an operation for setting the numbers of prints is completed by operating the OK button. Then, the order information processing unit 24 creates order information.

As a next stage of processing, a "name input screen" is displayed (#07). This screen shows a message "Please input your name." and an input board including a name display portion and a keyboard. After the name is inputted, a "telephone number input screen" is displayed as a next stage. This screen shows a message "Please input your telephone number." and an input board including a telephone number display portion and a keyboard (#08). The customer then touches the keyboard and to input a telephone number. Then, the operation proceeds to a next stage.

The process of inputting the customer's name and telephone number is not essential for printing purposes. A processing mode may be set to proceed to the next stage even when no such input is made. However, it is reasonable to set a processing mode such that, when the customer's name is not inputted, a number or sign created by the receiving apparatus is inputted automatically.

As the next stage of processing, an "order contents confirm screen" is displayed as shown in FIG. 12 (#09). This screen shows a message "Please confirm contents of the order." and a table showing details of the print output order inputted by the customer through the receiving apparatus 1, along with fees therefore. When no error is found in the contents displayed, the customer operates the OK button. Then, the order information and image information are stored in the directory affixed with the order number of this printing output order on the hard disk 14 (#10). That is, the printing information creating unit 26 stores the order information and image information created by the order information processing unit 24 in the directory (FIG. 4) created based on the order number given by the order identification information applying unit 25.

Next, a "media removal guide screen" is displayed (step #11). This screen shows a message "Please remove medium." When the customer removes the medium M1 following this message and operates the OK button, the operation proceeds to a next stage. When the customer operates the OK button without removing the medium M1, an alarm is given in electronic sound to indicate the wrong operation.

Figure 13:
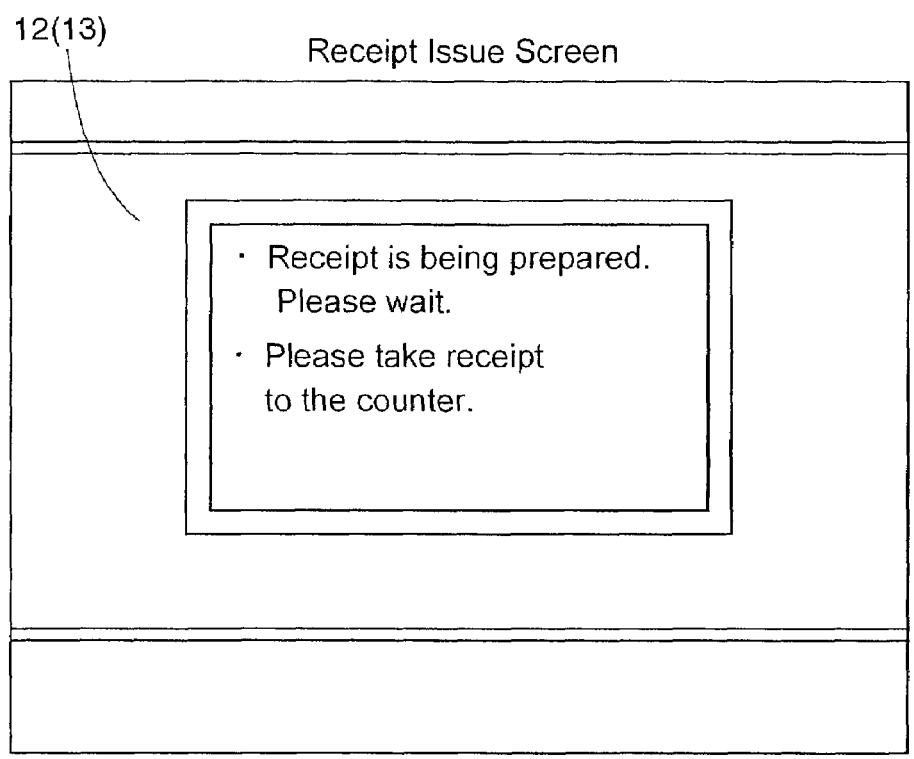
FIG. 13 is a view of a display screen showing one example of operating screen in time of receiving an order.

As the next stage of processing a "receipt issue guide screen" is displayed as shown in FIG. 13 (#12). This screen shows messages "Receipt is being prepared. Please wait." and "Please take receipt to the counter." Upon lapse of a predetermined time, the printer prints out a receipt as shown in FIG. 5. With the receipt issued this way, the reception processing is completed, and the initial screen is reinstated.

As described above, by using the receiving apparatus 1, the customer can carry out a required operation following the messages appearing on the display 12. Moreover, after setting a storage medium M1 such as Smart Media or CompactFlash storing image information acquired with a digital camera, or a CD-ROM or MO storing image information made by the customer, the customer may readily select images to be printed by looking at the thumbnail images shown on the display 12. When the customer produces a receipt issued in time of reception proceeding to a shop assistant at the service counter, the shop assistant may confirm that the print output order has been received.

What is claimed is:

1. A digital image receiving apparatus comprising:
    a media drive for reading image information from a storage medium;
    a display for displaying a variety of information;
    an image information processing unit for processing said image information to display a plurality of images in the image information read by said media drive, in thumbnail image form on said display;
    an order information processing unit for creating order information including which images to be printed from a printing order given by a customer for each image displayed on the display;
    an image data size acquisition unit for acquiring image data sizes of image data included in said image information and serving as printing sources, wherein information on said image data sizes acquired is displayed on said display as associated with thumbnail images of corresponding image information; and
    a print quality information determining unit for deriving, for said each image data, information on print quality including optimal print sizes as recommended print sizes which can be outputted for printing in an appropriate image quality, based on relationship between a resolution of a printing apparatus that forms images on recording sheet by using said image data, and said image data sizes;
    wherein information on said image data sizes acquired and said information on print quality including optimal print sizes are displayed on said display as associated with the respective thumbnail images of said image data.

2. A digital image receiving apparatus as defined in claim 1, wherein said information on said image data sizes displayed on said display as associated with said thumbnail images of said image data is expressed in sizes of display areas of said thumbnail images.

3. A digital image receiving apparatus as defined in claim 1, wherein said information on said image data sizes displayed on said display as associated with said thumbnail images of said image data is expressed in numerical values.

4. A digital image receiving apparatus as defined in claim 1, wherein said information on print quality shows differences between said optimal print sizes derived from said resolution of said printing apparatus and said image data sizes, and ordered print sizes.

5. A digital image receiving apparatus as defined in claim 4, wherein, when said image data sizes are not suitable for said ordered print sizes, the display areas of the corresponding thumbnail images are made smaller than when said image data sizes are suitable.

6. A digital image receiving apparatus as defined in claim 4, wherein said information on print quality is a rate of thinning-out or interpolation applied to the image data in time of printing.

7. A digital image receiving apparatus comprising:
    a media drive for reading image information from a storage medium;
    a display for displaying a variety of information;
    an image information processing unit for processing said image information to display a plurality of images in the image information read by said media drive, in thumbnail image form on said display;

an order information processing unit for creating order information including which images to be printed from a printing order given by a customer for each image displayed on the display; and a print quality information determining unit for deriving, for said each image data, information on print quality including optimal print sizes as recommended print sizes which can be outputted for printing in an appropriate image quality, based on relationship between a resolution of a printing apparatus that forms images on recording sheet by using image data included in said image information and serving as printing sources, and said image data sizes;

wherein said information on print quality including optimal print sizes is displayed on said display as associated with the respective thumbnail images of said image data.

8. A digital image receiving apparatus as defined in claim 7, wherein said information on print quality shows differences between said optimal print sizes derived from said resolution of said printing apparatus and said image data sizes, and ordered print sizes.

9. A digital image receiving apparatus as defined in claim 8, wherein, when said image data sizes are not suitable for said ordered print sizes, the display areas of the corresponding thumbnail images are made smaller than when said image data sizes are suitable.

10. A digital image receiving apparatus as defined in claim 8, wherein said information on print quality is a rate of thinning-out or interpolation applied to the image data in time of printing.

* * * * *